(12) United States Patent
Seymour

(10) Patent No.: US 7,986,509 B2
(45) Date of Patent: Jul. 26, 2011

(54) COMPOSITE ELECTRODE COMPRISING A CARBON STRUCTURE COATED WITH A THIN FILM OF MIXED METAL OXIDES FOR ELECTROCHEMICAL ENERGY STORAGE

(76) Inventor: Fraser Wade Seymour, Middletown, MD (US)

( * ) Notice: Subject to any disclaimer, the term of this patent is extended or adjusted under 35 U.S.C. 154(b) by 716 days.

(21) Appl. No.: 12/015,839

(22) Filed: Jan. 17, 2008

(65) Prior Publication Data

US 2009/0185327 A1   Jul. 23, 2009

(51) Int. Cl.
   *H01G 9/00* (2006.01)
(52) U.S. Cl. ........ 361/502; 361/503; 361/504; 361/512; 361/516; 361/517
(58) Field of Classification Search .................. 361/502, 361/508–512, 516–519, 303–305, 503–504, 361/321.4, 321.5
   See application file for complete search history.

(56) References Cited

U.S. PATENT DOCUMENTS

| 7,006,346 B2 * | 2/2006 | Volfkovich et al. | 361/502 |
| 7,612,985 B2 * | 11/2009 | Dementiev et al. | 361/502 |
| 7,651,819 B2 * | 1/2010 | Long et al. | 429/245 |
| 2006/0137817 A1 * | 6/2006 | Ma et al. | 156/296 |
| 2008/0247118 A1 | 10/2008 | Long et al. | |
| 2008/0248192 A1 | 10/2008 | Long et al. | |
| 2010/0176767 A1 | 7/2010 | Long et al. | |

OTHER PUBLICATIONS

Kim, "Synthesis and Characterization of MnO2-Based Mixed Oxides as Supercapacitors," Journal of the Electrochemical Society, vol. 150 No. (3); pp. D56-D62, Jan. 28, 2003.

* cited by examiner

*Primary Examiner* — Nguyen T Ha

(57) ABSTRACT

A composite electrode is created by forming a thin conformal coating of mixed metal oxides on a highly porous carbon structure. The highly porous carbon structure performs a role in the synthesis of the mixed oxide coating and in providing a three-dimensional, electronically conductive substrate supporting the thin coating of mixed metal oxides. The metal oxide mixture shall include two or more metal oxides. The composite electrode, a process for producing said composite electrode, an electrochemical capacitor and an electrochemical secondary (rechargeable) battery using said composite electrode are disclosed.

15 Claims, 3 Drawing Sheets

Bare Carbon Nanofoam     Composite

| Nickel Ratio | 1 | 1 | 1 | 0 |
| --- | --- | --- | --- | --- |
| Manganese Ratio | 4 | 2 | 1 | 1 |
| Capacity (F/g in 1M LiCl) | 131.4 | 107.58 | 94.78 | 99.27 |

| Temp (C) | Initial Mass | Final Mass | Oxide Mass | Mass Increase% | Oxide % of Final Mass |
| --- | --- | --- | --- | --- | --- |
| amb (~20) | 0.0253 | 0.0355 | 0.0102 | 40.32 | 28.73 |
| 40 | 0.0248 | 0.0335 | 0.0087 | 35.08 | 25.97 |
| 60 | 0.026 | 0.0364 | 0.0104 | 40.00 | 28.57 |
| 80 | 0.0265 | 0.036 | 0.0095 | 35.85 | 26.39 |

COMPOSITE ELECTRODE COMPRISING A CARBON STRUCTURE COATED WITH A THIN FILM OF MIXED METAL OXIDES FOR ELECTROCHEMICAL ENERGY STORAGE

STATEMENT REGARDING FEDERALLY SPONSORED RESEARCH OR DEVELOPMENT

BACKGROUND OF THE INVENTION

1. Field of the Invention

The present invention relates to a composite of materials for use as an electrode for electrochemical energy storage devices such as electrochemical capacitors (ECs) and secondary batteries, and a method for producing the same. More specifically, this invention relates to a composite electrode consisting of a highly porous carbon structure coated with a conformal film comprising a mixture of transition metal oxides, a method for producing the same, and an EC and secondary battery using the composite.

2. Brief Description of Related Art

Like secondary batteries, electrochemical capacitors (referred to as ultracapacitors or supercapacitors) are devices that use electrolytes that contain and conduct ions in conjunction with electrodes that are ionically and electronically conductive, as a system to store energy. Unlike batteries, which store charge within the bulk electrode material itself, ECs store charge at or near the interface between the electrolyte and electrode material making EC storage a surface phenomenon. EC devices store charge via one of two mechanisms: electric "double-layer" or faradaic "pseudocapacitance".

Electric double layer capacitors (EDLCs) store charge at the interface between the ion-rich electrolyte and an electronically conductive electrode composed of material such as activated carbon (AC). The amount of charge stored is a function of this interfacial area, which is in turn related to the electrode surface area accessible by the electrolyte-solvated ions. AC electrodes typically have surface areas between 1000 and 3000 $m^2/g$ achieved by a high concentration of micropores (pore diameter <2 nm). This concentration of micropores paradoxically serves to limit the capacitance to a range between 15 and 30 $uF/cm^2$ because micropores are too small to accommodate the solvated ions necessary for the double layer mechanism. Further, AC electrodes are typically fabricated as films formed from a paste comprising powdered AC, binder and conductivity-enhancing carbon. While the accessibility of the electrolyte to much of the surface area of such an electrode is limited thus limiting the electrode capacitance and ultimately device energy density, the micropore geometries also serve to limit electrode charge/discharge rates and ultimately limit device power density.

Pseudocapacitance involves electron transfer in oxidation/reduction reactions that take place between the electrolyte ions and the electrode active materials over a voltage range similar to that of the EDLC. Electrode active materials being researched for this type of behavior include graphitic carbons, conductive polymers and transition metal oxides.

Transition metal oxides exhibit characteristics both desirable and otherwise for EC devices. In general, these oxides exhibit improved specific capacitance vs. carbon materials, but they typically do so at a monetary cost or at the expense of cycle life and power density. As an example of the former, the specific capacitance of hydrous ruthenium oxide has been demonstrated to be higher than 700 F/g which is far greater than any known carbon EDLC. However, the cost and lack of abundant supply of the ruthenium materials prohibit broad commercial use.

Lower cost, plentiful transition metal oxides such as manganese oxide, nickel oxide and others have been investigated and in some cases commercialized. The specific capacitance of these materials ranges from approximately 200 F/g for powder/paste derived thick films (tens of microns to hundreds of microns) to more than 500 F/g for very thin planar films of less than 100 nanometers. This difference in capacitance (and ultimately energy density) demonstrates the surface nature of the pseudocapacitance charge storage mechanism. However, power density also is limited by the surface nature of pseudocapacitance as the longer ion diffusion length of thicker material serves to reduce reaction rate. The power density of electrodes using these oxides is further limited by the very low intrinsic electronic conductivity of these materials. These oxides also exhibit limited cycle stability and operating voltage ranges limited to approximately 0.6-0.8 volts.

Metal oxide paste-derived electrodes combine the powdered metal oxide with a binder and conductivity-enhancing carbon similar to the EDLC activated carbon electrode. The resulting electrode is limited by the characteristics noted above and also the lack of surface area readily accessible to the electrolyte. The tortuous pore configuration also impedes ion flow to the inner electrode surfaces further limiting the pseudocapacitance reaction rate.

As a result of these limitations, EC devices employing a metal oxide thick film configure their systems in such a way so as to use the oxide-based electrode as a largely static energy storage element creating an offset voltage from which a carbon electrode only is cycled through charge and discharge. This configuration is known in the art as an asymmetric EC and it does not make use of a metal oxide's ability to be cycled through charge and discharge.

One drawback to this type of asymmetric EC approach is that the cell must be maintained at a voltage level no less than approximately half the rated cell voltage, creating a potential safety hazard. Further, limiting the operating voltage range of the device serves to limit the usable energy as well as limit market applications of the device. More ideal would be an EC device able to operate over the entire voltage range while retaining optimally high power density.

Another approach employs a very thin metal oxide planar film. This configuration yields higher specific capacitance, better reaction rate and is less affected by the low electronic conductivity of the metal oxide. Unfortunately, its limited planar surface area makes it impractical as an EC electrode.

U.S. Pat. No. 6,339,528 discloses the synthesis of manganese oxide on a non-structural carbon, which is then ground to form a paste used with a binder to form an electrode. Others have suggested similarly coating loose, non-structured carbon nanotubes with manganese oxide subsequently mixing the coated nanotubes with a binder to form an EC electrode. While each of these approaches offer improved rate performance resulting from the reduced ion diffusion length vs. the simple oxide paste electrodes, they do not resolve the underlying problems associated with electronic conductivity and electrolyte accessibility.

Long et al. with the U.S. Naval Research Laboratory have proposed an approach for addressing these shortcomings by applying a very thin coating of manganese oxide to a carbon structure. In doing so, the high capacitance and fast reaction rate of the thin film approach is preserved. Further, the 3-dimensional carbon structure provides a low (electronic) resistance path to the current collector and an open porosity providing much improved electrolyte ion access to the manganese oxide active material. The synthesis approach suggested by Long takes place as the coating is deposited utilizing the carbon as a sacrificial reductant to synthesize the manganese oxide. The manganese oxide deposition method suggested by Long results in a conformal coating of the carbon structure. This approach is expected to yield improved power density vs. powder/paste based electrodes.

While Long's approach does improve many of the shortcomings of manganese oxide as an EC electrode active material, it is limited to the formation of a manganese oxide only film. Popov et al. with the University of South Carolina demonstrated a 10% improvement in operating voltage range and a 25% increase in capacity vs. a manganese-only approach. This was accomplished by creating a mixed oxide comprising manganese and either lead oxide or nickel oxide, the latter leading to these aforementioned improvements. Popov did not utilize a carbon structure but rather created a mixed oxide powder through Sol-Gel techniques, mixed these powders with a binding agent and conductivity enhancing carbon to create a paste electrode.

While the previously discussed improvements in EC technology are highly significant, there remains a need in the art for EC devices and therefore EC electrodes having improved cycle life stability, expanded the operating voltage range and increased the storage capacity while also exhibiting improved power density.

Lithium ion secondary batteries operate through the intercalation/de-intercalation of lithium ions into and out of the solid bulk electrode materials. Today's lithium ion electrode materials typically comprise a graphite-based anode and a transition metal oxide (typically cobalt, nickel or manganese) cathode. During the charging cycle, electrons are removed from the cathode, which causes charge-compensating lithium ions to be released into the electrolyte while electrons are simultaneously added to the anode causing lithium ions to be inserted into the anode. The opposite occurs during discharge.

Ion insertion (diffusion) into the bulk oxide cathode material takes place in structural vacancies present in the oxides. The rate of this process is affected by the size of the vacancies relative to the solvated ion, the diffusion length and the accessibility of the electrolyte to the oxide. This rate in turn affects the instantaneous power capability of the battery.

The fabrication method of these electrodes relies on powdered active materials formed into a paste including binder material and (electronic) conductivity enhancing carbon. The thickness of these cathode structures ranges from 30 micrometers for high power (low energy) batteries to 200 micrometers for high-energy (low power) versions. Typical oxide powder particle sizes vary from hundreds of nanometers to a few micrometers in diameter. Lithium ions must penetrate these macroscopic cathode structures through the electrolyte and subsequently diffuse as much as a few microns into the bulk oxide particle. The charge-compensating electrons from the oxide must then traverse the low-conductivity oxide and electrolyte voids to complete the circuit.

Ion diffusion into the solid-state electrode particles induces mechanical stress on the oxide as it expands to accommodate the ion. These expansion/contraction cycles cause the eventual breakdown of the oxide limiting device cycle life. It is therefore preferable for the oxide vacancies to be of a size relative to the solvated ion so as to allow ion diffusion with minimal expansion. For the same reason, it is also preferable for the diffusion to be as shallow as possible and to choose ion/oxide systems that exhibit minimal expansion.

Some have proposed using a paste of oxide-coated carbon powder in an effort to reduce rate-induced capacity fade and to improve instantaneous power capability. While this approach may provide some improvement in diffusion rate, it does not address the need for a through-connected electron path nor does it address the need for an open electrode structure to accommodate electrolyte accessibility to the cathode active materials.

While the previously discussed improvements in secondary battery technology are highly significant, there remains a need in the art for secondary battery devices and therefore secondary battery electrodes having improved cycle life, shorter recharge time and generally increased usable storage capacity at elevated power levels.

SUMMARY OF THE INVENTION

The aforementioned need for improvements in electrode cycle life, operating voltage range and storage capacity for an EC device as well as improvements in electrode cycle life, reduced recharge times and increased usable storage capacity at elevated secondary battery power levels are provided by the use of a composite consisting of a highly porous carbon structure coated with a film comprising a mixture of transition metal oxides. The mixed oxide film is synthesized and simultaneously deposited thereby forming a conformal mixed oxide coating upon the highly porous carbon structure.

Such composite electrode nanoscopic thin mixed oxide film exhibits high specific capacity because the oxide active material is more accessible to the electrolyte ions than is possible with oxide powder-based approaches.

The openness of the composite provides electrolyte ion access to the mixed oxide film in a way that supports high rate ion transport with minimized ion starvation.

While many factors affect the rate of diffusion of an ion into a metal oxide during intercalation (approximately $10^{-9}$ cm$^2$/s for lithium into $LiMnO_2$), it is clear such processes occur relatively slowly. Therefore, intercalation reaction rates are faster where diffusion lengths are shorter as is the case in thinner oxide layers. Due to the nanoscopic thin mixed oxide film, the ion diffusion length is as much as two orders of magnitude less than that of typical oxide powder based films having micron-scale powder grains. The result is an enhanced rate of intercalation reaction versus powder oxide film approaches.

The carbon substrate exhibits a very high electronic conductivity of 20-50 Siemens/cm or more vs. $10^{-5}$ to $10^{-8}$ Siemens/cm for manganese oxide, depending upon the oxide phase. This reduction in electrode electronic resistance of between 5 and 8 orders of magnitude will greatly improve device power density and reduce heat generated.

The mixed oxide exhibits increased capacity and a greater operating voltage range with improved stability vs. a single oxide film. For example, in the case of a nickel/manganese oxide mix, the partial substitution of the nickel oxide improves structural stability and provides an additional layered oxide phase improving ion vacancy access vs. a manganese-only oxide. Mixed nickel/manganese oxide also has a higher theoretical capacity at a wider electrochemical potential than does manganese oxide alone so the resulting mixed oxide will exhibit increased energy density. The partial substitution of a second transition metal oxide for $Mn_2O_4$ variant manganese oxide also simplifies the intercalation reaction in the case of higher-potential lithium ion battery cycling by inhibiting the $Mn_2O_4$ phase transition thereby reducing associated heat generation and structural stress.

The composite electrode not only is suitable as a material for EC and secondary batteries, but also may be used as fuel cell electrodes, hydrogen absorption and hydrogen production and electrolysis.

DETAILED DESCRIPTION OF THE INVENTION

Figures 1, 2, 3:
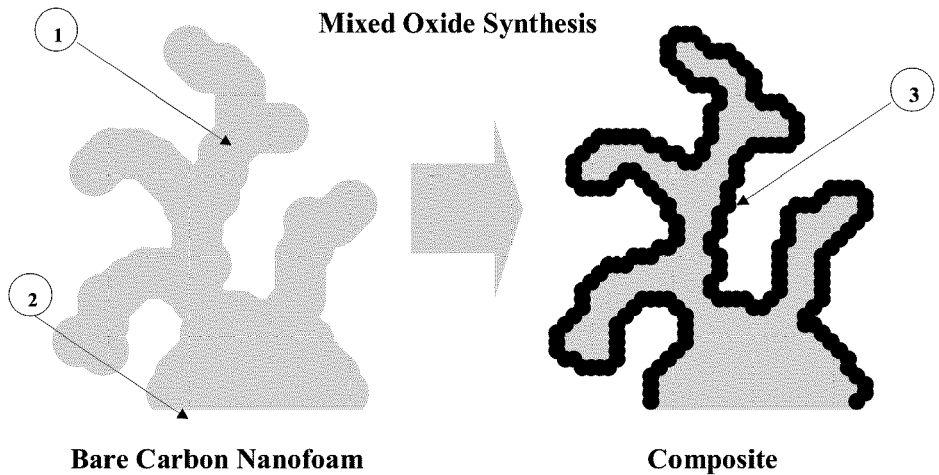
FIG. 1 shows a cross-sectional view of the mixed oxide coating on a porous carbon structure forming a composite electrode. 1 represents bare carbon structure, 2 represents current collector and 3 represents mixed oxide layer on composite electrode.
FIG. 2 shows a chart comprising the various nickel/manganese concentrations used.
FIG. 3 is a table showing the mixed oxide mass uptake over a range of temperatures from ambient to 80.degree.Celsius.

The present invention is directed particularly towards composite electrodes created by forming a thin conformal coating of mixed metal oxides on a highly porous carbon structure for use in electrochemical energy storage devices including electrochemical capacitors and secondary batteries. Such electrochemical capacitor or secondary battery comprises an electrolyte, an electronically insulating but ionically conductive separator film, a pair of electrodes separated by said separator and electrolyte, each electrode physically attached and electronically connected to a current collector, wherein at least one of said electrodes comprise the composite electrode comprising a porous carbon structure with a conformal surface coating of mixed metal oxides as described herein. The second electrode, if not a composite electrode as defined herein, is selected from a group consisting of a metal oxide; a metal carbide; a metal nitride; a composite carbonaceous paste comprising activated carbon powder, binder and conductivity enhancing carbon; a composite carbonaceous paste comprising graphite powder, binder and conductivity enhancing carbon; or a porous carbon structure. The electrolyte comprises a non-aqueous solution, an aqueous solution or polymer containing derivatives of alkali metals including but not limited to hydroxides, sulfates and chlorides of said alkali metals or any combination thereof. The current collector is selected from a group consisting of metal foil, metal mesh, electrically conductive polymer composites and expanded metal.

Hereinafter, various embodiments of the present invention will be explained in more detail with reference to the accompanying figures; however, it is understood that the present invention should not be limited to the following preferred embodiments and such present invention may be practiced in ways other than those specifically described herein.

A composite electrode comprises a porous carbon structure with a conformal surface coating of mixed metal oxides produced by immersion in a precursor solution. The composite electrode comprises pores including above average and below average pore size wherein the pores of above average pore size are not generally occluded by the metal oxide coating. In one embodiment, the porous carbon structure comprises a carbon xerogel/ambigel that has been templated and is supported by carbon nanofibers. The porous carbon structure possesses pores with an average diameter larger than about 5 nanometers and smaller than about 5 micrometers. In one embodiment, the mixed metal oxide coating comprises manganese, titanium and one or more of nickel, iron and vanadium. In another embodiment, the mixed metal oxide coating comprises manganese, cobalt and one or more of nickel, iron and vanadium. In another embodiment, the mixed metal oxide coating comprises manganese, tin and one or more of nickel, iron and vanadium. In another embodiment, the mixed metal oxide coating comprises manganese, lead and one or more of nickel, iron and vanadium. In another embodiment, the mixed metal oxide coating comprises manganese, aluminum and one or more of nickel, iron and vanadium. In other embodiments, the mixed metal oxide coating comprises two or more metal oxides selected from a group consisting of oxides of manganese, cobalt, aluminum, chromium, molybdenum, rhodium, iridium, osmium, rhenium, tungsten, tantalum, palladium, lead, tin and titanium. The average thickness of the mixed metal oxide coating is greater than 10 nanometers and less than 1000 nanometers. The metal oxide coating mixture is composed of a nanocrystalline phase, a polycrystalline phase, an amorphous phase or any combination of these phases. Immersion is performed by chemical bath or pressure spray application. Infiltration is accomplished with aqueous precursor solution maintained at a temperature above about 20.degree.C and below about 80.degree.C. The coating is produced by an oxidation/reduction reaction occurring between the metal salt contained in an aqueous precursor solution and the surface of the porous carbon structure when the porous carbon structure is infiltrated with the precursor solution which is reduced on the surface of the carbon and co-deposited in oxide form upon the carbon. The aqueous metal salt precursor solution comprises two or more salts of metals selected from a group consisting of manganese, nickel, cobalt, iron, aluminum, chromium, molybdenum, rhodium, iridium, osmium, rhenium, vanadium, tungsten, tantalum, palladium, lead, tin and titanium. In one embodiment, the aqueous metal salt precursor solution comprises a pH buffer, $Ni(NO_3)_2 6H_2O$ and one of $NaMnO_4$, $KMnO_4$ or $LiMnO_4$. In one embodiment, the composite electrode is used as prepared.

The metal oxide coating mixture shall comprise structural water, ions and two or more metal oxides selected from a group consisting of oxides of manganese, nickel, cobalt, iron, aluminum, chromium, molybdenum, rhodium, iridium, osmium, rhenium, vanadium, tungsten, tantalum, palladium, lead, tin and titanium.

The porous carbon structure is selected from a group of three-dimensional structures consisting of carbon aerogel nanofoam, aligned carbon nanofiber structure, unaligned carbon nanofiber structure, aligned carbon nanotube structure, unaligned carbon nanotube structure, carbon xerogel/ambigel structure, templated porous carbon film, porous preformed carbon powder film or any combination thereof. In one preferred embodiment, the mixed oxide film comprises primarily manganese oxide and nickel oxide deposited on a carbon nanofoam structure.

Composite electrode structures may be used as-synthesized or may be annealed at temperatures above 200.degree.C. and typically below 1000.degree.C. Such annealing will convert a non-crystalline oxide to a crystalline phase and, when a lithium counter-ion synthesis precursor is used, will enable solid-state electrode pre-lithiation.

EXAMPLE I

Fabrication of Composite Electrode; Mixed Manganese/Nickel Oxide Film on Carbon Nanofoam A composite electrode as illustrated in FIG. 1 was formed by immersing a carbon structure for a controlled period of time in a solution comprising permanganate and nickel salts in a controlled ratio dissolved in ultra-pure water/pH buffer at a controlled pH and temperature. The manganese and nickel from the aqueous permanganate/nickel precursor solution are reduced on the surface of the carbon and co-deposited upon the carbon forming an insoluble mixed oxide film.

Carbon paper and aerogel ("nanofoam") was purchased from a commercial source (Marketech International Inc.) with an approximate thickness of 170 micrometers. Carbon nanofoam paper was cut into pieces of approximately 1 centimeter by 1 centimeter and then soaked and vacuum saturated in purified water.

The aqueous mixed metal salt precursor solution comprised manganese/nickel mixture ratios as follows: 4:1, 2:1, 1:1, 1:2 and 1:4. FIG. 2 shows the specific capacity of the first three ratios and one sample of manganese only for comparison purposes. In these cases, the mixture concentrations of nickel (II) nitrate hexahydrate $(Ni(NO_3)_2 \cdot 6H_2O)$ were normalized to 0.1M sodium permanganate $(NaMnO_4$, other counter-ion sources may be substituted for sodium (Na) such as potassium (K) or lithium (Li)) and combined with purified water/pH buffer solution of 0.1M $NaH_2PO_4$ and 0.1M NaOH for neutral pH film synthesis. Another experiment was carried out at an elevated pH of 12 using a buffer solution of 0.05M $Na_2HPO_4$ and 0.1M NaOH.

The wetted carbon nanofoam was then immersed in the precursor solutions for a period of time ranging from approximately 2 hours to 20 hours. These synthesis processes were carried out at room temperature.

The resulting composite structures were removed from the precursor solution, rinsed with purified water and dried in a nitrogen environment at 50.degree.C. for 20 hours and again under vacuum at room temperature for an additional 12 hours.

Subsequent experiments have been carried out wherein the synthesis/deposition process was carried out at temperatures of 40, 60 and 80.degree.C. without any noticeable change in the mass of the mixed oxide film. Results are shown in FIG. 3.

EXAMPLE II

Figure 4:
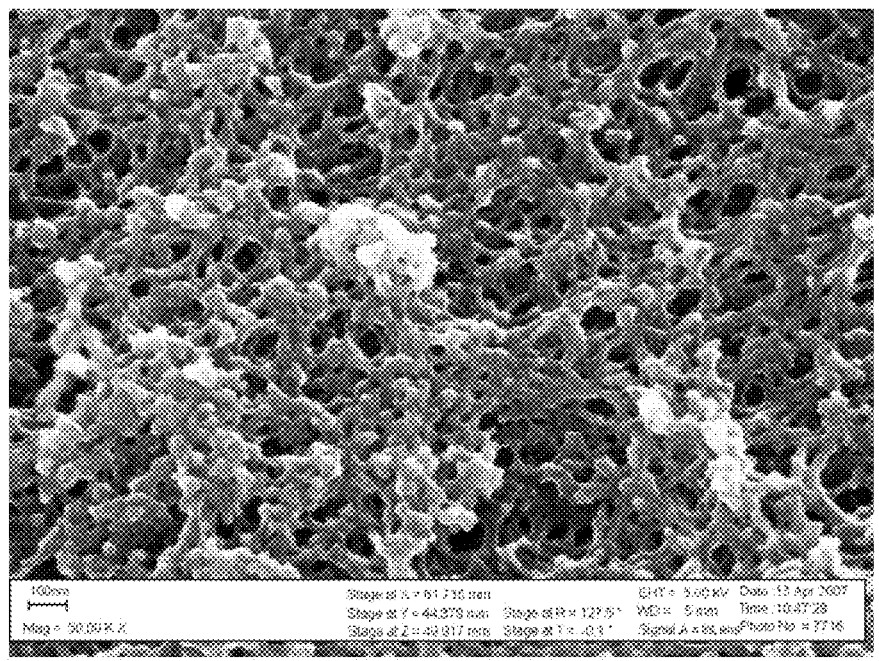
FIG. 4 shows a scanning electronic micrograph of a nickel/manganese mixed oxide film on a porous carbon nanofoam structure.

Characterization of Composite Electrode; Mixed Manganese/Nickel Oxide Film on Carbon Nanofoam The resulting composite structure is shown in FIG. 4 scanning electronic micrograph image. This image clearly shows the composite feature scale, the conformal mixed oxide coating and the absence of pore occlusion.

Figure 5:
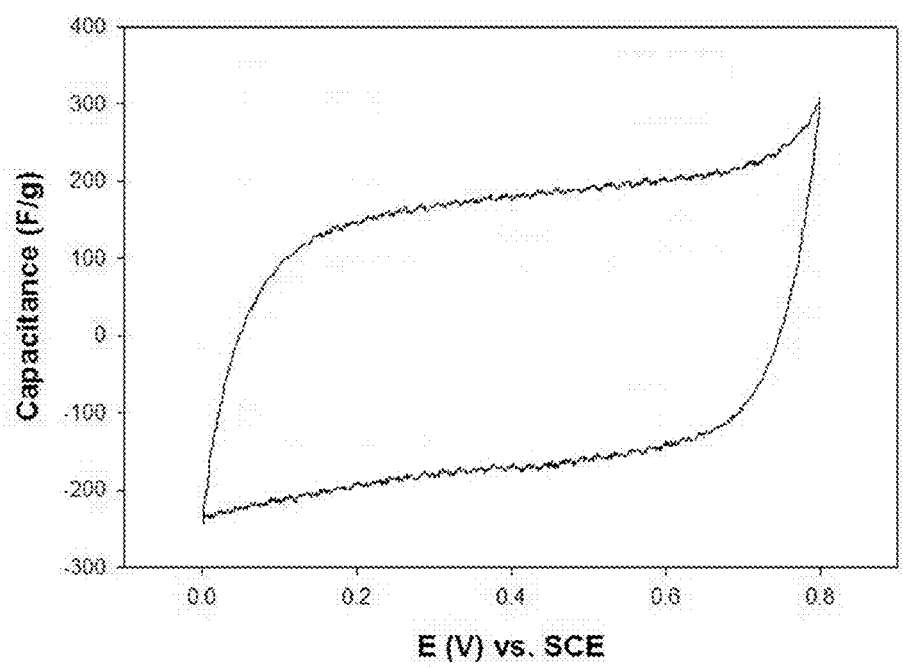
FIG. 5 shows a cyclic voltammogram for Example 1 composite electrode at 10 mv/S in 1M LiCl.
Figure 6:
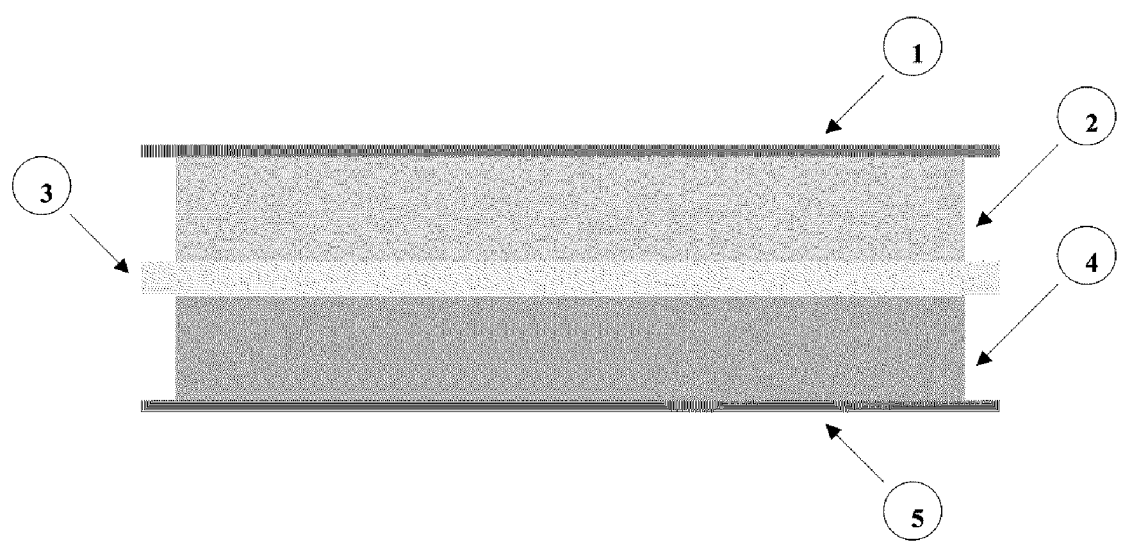
FIG. 6 shows a constitutional drawing of an electrochemical cell such as an EC or secondary battery. 1 represents the cathode current collector, 2 represents the cathode, 3 represents the electrolyte/separator, 4 represents the anode and 5 represents the anode current collector.

The table in FIG. 2 shows a 32% increase in capacitance of the 4:1 manganese/nickel mixed oxide (131.4 F/g) vs. the manganese only composite (99.27 F/g) in 1M LiCl electrolyte. Subsequent experiments have yielded capacitances of 180 F/g for the 4:1 manganese/nickel mixed oxide in this electrolyte and approximately 200 F/g in other electrolytes such as potassium hydroxide (KOH). FIG. 5 shows cyclic voltammetry data of a 4:1 manganese/nickel mixed oxide composite with capacitance of approximately 180 F/g in 1M LiCl electrolyte.

Although embodiments of the invention have been described, it is understood that the present invention should not be limited to those embodiments, but various changes and modifications can be made by one skilled in the art within the spirit and scope of the invention as hereinafter claimed.

What is claimed is:

1. A composite electrode comprising a porous carbon structure having a conformal surface coating of mixed metal oxides; the pores of said porous carbon structure including above average and below average pore size and wherein said pores of above average pore size are not generally occluded by said metal oxide coating; wherein said porous carbon structure comprises a carbon xerogel/ambigel that has been templated, said porous carbon structure further comprising carbon nanofibers for increased mechanical support of said templated carbon xerogel/ambigel; wherein said porous carbon structure possesses pores with an average diameter larger than about 5 nanometers and smaller than about 5 micrometers; said mixed metal oxide coating comprising oxides of manganese, titanium and one or more of nickel, iron and vanadium; or oxides of manganese, cobalt and one or more of nickel, iron and vanadium; or oxides of manganese, tin and one or more of nickel, iron and vanadium; or oxides of manganese, lead and one or more of nickel, iron and vanadium; or oxides of manganese, aluminum and one or more of nickel, iron and vanadium; or two or more metal oxides selected from a group consisting of oxides of manganese, cobalt, aluminum, chromium, molybdenum, rhodium, iridium, osmium, rhenium, tungsten, tantalum, palladium, lead, tin and titanium; wherein the average thickness of said mixed metal oxide coating is greater than 10 nanometers and less than 1000 nanometers; said metal oxide coating mixture composing a nanocrystalline phase, a polycrystalline phase, an amorphous phase or any combination thereof.

2. A secondary battery cell comprising an electrolyte, an electronically insulating but ionically conductive separator film, a pair of electrodes separated by said separator and electrolyte, each electrode physically attached and electronically connected to a current collector, at least one of said electrodes comprising the composite electrode of claim 1.

3. The secondary battery cell of claim 2 said electrolyte comprising a non-aqueous solution, an aqueous solution or polymer containing derivatives of alkali metals.

4. The secondary battery cell of claim 2 wherein the current collector is selected from a group consisting of metal foil, metal mesh, electrically conductive polymer composites and expanded metal.

5. The secondary battery cell of claim 2 wherein at least one electrode is selected from a group consisting of a metal oxide; a metal carbide; a metal nitride; a composite carbonaceous paste comprising graphite powder, binder and conductivity enhancing carbon or a porous carbon structure.

6. A method for producing a composite electrode comprising a porous carbon structure with a conformal surface coating of mixed metal oxides wherein said coating is produced by an oxidation/reduction reaction occurring between the metal salt contained in an aqueous precursor solution and the surface of said porous carbon structure when said porous carbon structure is infiltrated with said precursor solution which is reduced on the surface of the carbon and co-deposited in oxide form upon the carbon.

7. The method for producing the composite electrode of claim 6 wherein said infiltration is accomplished by immersion of said carbon structure in a bath of said aqueous metal salt precursor solution or by application of pressure spray consisting of said aqueous metal salt precursor solution upon said carbon structure.

8. The method for producing the composite electrode of claim 6 wherein said aqueous metal salt precursor solution shall comprise two or more salts of metals selected from a group consisting of manganese, nickel, cobalt, iron, aluminum, chromium, molybdenum, rhodium, iridium, osmium, rhenium, vanadium, tungsten, tantalum, palladium, lead, tin and titanium.

9. The method for producing the composite electrode of claim 6 wherein said aqueous metal salt precursor solution shall comprise a pH buffer, Ni(NO$_3$)$_2$ 6H$_2$O and one of NaMnO$_4$, KMnO$_4$ or LiMnO$_4$.

10. A capacitor cell comprising an electrolyte, an electronically insulating but ionically conductive separator film, a pair of electrodes separated by said separator and electrolyte, each electrode physically attached and electronically connected to a current collector, at least one of said electrodes comprising the composite electrode of claim 1.

11. The capacitor cell of claim 10 said electrolyte comprising a non-aqueous solution, an aqueous solution or polymer containing derivatives of alkali metals.

12. The capacitor cell of claim 10 wherein the current collector is selected from a group consisting of metal foil, metal mesh, electrically conductive polymer composites and expanded metal.

13. The capacitor cell of claim 10 wherein at least one electrode is selected from a group consisting of a metal oxide; a metal carbide; a metal nitride; a composite carbonaceous paste comprising activated carbon powder, binder and conductivity enhancing carbon or a porous carbon structure.

14. The method for producing the composite electrode of claim 6, wherein the composite electrode is annealed at temperatures above about 200 degree C. and below about 1000 degree C. subsequent to formation of the mixed oxide coating.

15. The method for producing the composite electrode of claim 6 wherein said aqueous precursor solution is maintained at a temperature above about 20 degree C. and below about 80 degree C.

* * * * *